(12) United States Patent
Penha et al.

(10) Patent No.: US 10,341,270 B2
(45) Date of Patent: Jul. 2, 2019

(54) PROVIDING ENHANCED APPLICATION INTEROPERABILITY

(71) Applicant: Citrix Systems, Inc., Fort Lauderdale, FL (US)

(72) Inventors: Priscila K. Penha, San Francisco, CA (US); Kelly M. Nash, San Mateo, CA (US); Daisuke Sakurai, San Francisco, CA (US); Shih-Hao Yeh, San Francisco, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 446 days.

(21) Appl. No.: 14/515,646

(22) Filed: Oct. 16, 2014

(65) Prior Publication Data
US 2015/0113446 A1    Apr. 23, 2015

Related U.S. Application Data

(60) Provisional application No. 61/893,006, filed on Oct. 18, 2013.

(51) Int. Cl.
*H04L 12/58*      (2006.01)
*G06F 3/0484*    (2013.01)
(Continued)

(52) U.S. Cl.
CPC .......... *H04L 51/046* (2013.01); *G06F 1/1694* (2013.01); *G06F 3/017* (2013.01);
(Continued)

(58) Field of Classification Search
CPC ............................ H04L 51/046; G06F 3/0484
See application file for complete search history.

(56) References Cited

U.S. PATENT DOCUMENTS 8,856,679 B2 * 10/2014 Sirpal .................. G06F 3/1438
                                                                    715/790
9,262,059 B2 *  2/2016 Kim ..................... G06F 3/0484
(Continued)

OTHER PUBLICATIONS

"Handling Rotation", posted on Feb. 27, 2012 at https://developer.xamarin.com/guides/android/application_fundamentals/handling_rotation, retrieved Nov. 14, 2016.*
(Continued)

*Primary Examiner* — Shourjo Dasgupta
(74) *Attorney, Agent, or Firm* — Banner & Witcoff, Ltd.

(57) ABSTRACT

Methods, systems, and computer-readable media for providing enhanced application interoperability are presented. In some embodiments, a computing device may present, on at least one display screen, a first user interface that is associated with a first application. In response to determining that the at least one display screen has been rotated from a first orientation to a second orientation, the computing device may present, on the at least one display screen, a second user interface that is associated with a second application different from the first application. In one or more embodiments, the second user interface may include at least some information that is contextually related to information included in the first user interface. In addition, a state of the first application may be preserved when the second user interface that is associated with the second application is presented.

20 Claims, 16 Drawing Sheets

(51) Int. Cl.
*G06F 1/16* (2006.01)
*G06F 3/01* (2006.01)
*H04M 1/725* (2006.01)

(52) U.S. Cl.
CPC ...... *G06F 3/0484* (2013.01); *H04M 1/72522* (2013.01); *G06F 2200/1637* (2013.01)

(56) References Cited

U.S. PATENT DOCUMENTS

| | | | | |
|---|---|---|---|---|
| 2009/0288037 | A1* | 11/2009 | Lawton | G06F 3/0481 715/804 |
| 2010/0146442 | A1* | 6/2010 | Nagasaka | G06Q 10/10 715/810 |
| 2012/0240056 | A1* | 9/2012 | Webber | G06Q 10/107 715/752 |
| 2013/0173699 | A1* | 7/2013 | Parks | H04W 4/008 709/203 |
| 2014/0098038 | A1* | 4/2014 | Paek | G06F 1/1692 345/173 |
| 2014/0201760 | A1* | 7/2014 | Kraljic | G06F 9/543 718/108 |
| 2014/0280486 | A1* | 9/2014 | Seay | H04L 67/02 709/203 |

OTHER PUBLICATIONS

Jim Tanous, "TotalSpaces: How Virtual Desktops on OS X Got Its Groove Back", posted on Feb. 27, 2012 at https://www.macobserver.com/tmo/article/totalspaces-how-virtual-desktops-on-os-x-got-its-groove-back, retrieved Nov. 14, 2016.*

* cited by examiner

FIG. 6

PROVIDING ENHANCED APPLICATION INTEROPERABILITY

CROSS-REFERENCE TO RELATED APPLICATIONS

This application claims the benefit of U.S. Provisional Patent Application Ser. No. 61/893,006, filed Oct. 18, 2013, and entitled "PROVIDING ENHANCED APPLICATION INTEROPERABILITY," and which is incorporated by reference herein in its entirety.

BACKGROUND

Aspects of the disclosure generally relate to computing hardware and computer software. In particular, one or more aspects of the disclosure relate to computing hardware and computer software for providing enhanced application interoperability.

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand greater convenience, functionality, and ease-of-use from their computing devices and the computer software with which they interact.

SUMMARY

Aspects of the disclosure relate to various systems and techniques that provide more convenient, functional, and easy-to-use ways for users to interact with user interfaces provided by computing devices and/or computer software.

Some mobile device applications may include multiple micro-applications or unique content areas that can be used in interacting with different types of content. For example, an enterprise communication application might not only include email management software (e.g., an email client application for interacting with email content), but also may include calendar management software (e.g., a calendar application for interacting with calendar content) and task management software (e.g., a task manager application for interacting with task management content).

Because such an application may provide different content areas or micro-applications for interacting with different types of content, it may be difficult for a user to reference and/or interact with one content area (e.g., to review and/or modify appointments within a calendar management content area) while he or she is completing a task in another content area (e.g., while the user is reading and/or composing an email message in an email management content area) on the mobile device.

Aspects of the disclosure provide efficient, effective, and convenient ways of allowing a user to switch between applications, micro-applications, and/or content areas, so as to enable the user to quickly and easily interact with different types of content. In particular, in accordance with various aspects of the disclosure, a mobile device user may rotate his or her mobile device (e.g., from portrait orientation to landscape orientation or vice versa) to quickly open and/or switch to an alternate application so as to view and/or reference information associated with that application, without losing his/her place in the current workflow of the application displayed prior to the rotation.

In some instances, the view that is provided after the device is rotated may be contextually related to the view displayed prior to the rotation of the device. For example, if the user is viewing email content in an email management application that includes a reference to a particular date or appointment, and the user rotates the device, the device then may display calendar content in a calendar management application, and such calendar content may correspond to the particular date or appointment and/or be otherwise contextually related to the email content that was displayed prior to the rotation of the device.

In accordance with one or more aspects of the disclosure, a computing device may present, on at least one display screen, a first user interface that is associated with a first application. Subsequently, the computing device may determine that the at least one display screen has been rotated from a first orientation to a second orientation. For example, the computing device may determine that the at least one display screen has been rotated from a portrait orientation to a landscape orientation, or vice versa.

Based on determining that the at least one display screen has been rotated from the first orientation to the second orientation, the computing device may present, on the at least one display screen, a second user interface that is associated with a second application different from the first application. In one or more embodiments, the second user interface may include at least some information that is contextually related to information included in the first user interface. In addition, a state of the first application may be preserved when the second user interface that is associated with the second application is presented.

In some embodiments, functionality of the second application may be limited when the second user interface that is associated with the second application is presented on the at least one display screen in the second orientation. Additionally or alternatively, the first application may be suspended in a background mode when the second user interface that is associated with the second application is presented.

In some embodiments, after presenting the second user interface that is associated with the second application, the computing device may receive user input via the second user interface. Subsequently, the computing device may update the second user interface based on the user input.

In some embodiments, after presenting the second user interface that is associated with the second application, the computing device may determine that the at least one display screen has been rotated from the second orientation to the first orientation. Based on determining that the at least one display screen has been rotated from the second orientation to the first orientation, the computing device may present, on the at least one display screen, the first user interface that is associated with the first application. In some instances, the state of the first application may be restored when the first user interface that is associated with the first application is presented after determining that the at least one display screen has been rotated from the second orientation to the first orientation.

In some embodiments, the first application may provide contextual information to the second application in accordance with one or more policies. In some instances, the first application is a mail application and the second application is a calendar application. In other instances, the first application is a contacts application and the second application is a chat application. In other instances, the first application is a calendar application and the second application is a tasks application. In other instances, the first application is a calendar application and the second application is a notes application.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2-7 depict example user interfaces that may be displayed in accordance with one or more illustrative aspects discussed herein.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing enhanced application interoperability. Before discussing these concepts in greater detail, however, several examples of a computing device that may be used in implementing and/or otherwise providing various aspects of the disclosure will first be discussed with respect to FIG. 1.

Figure 1:
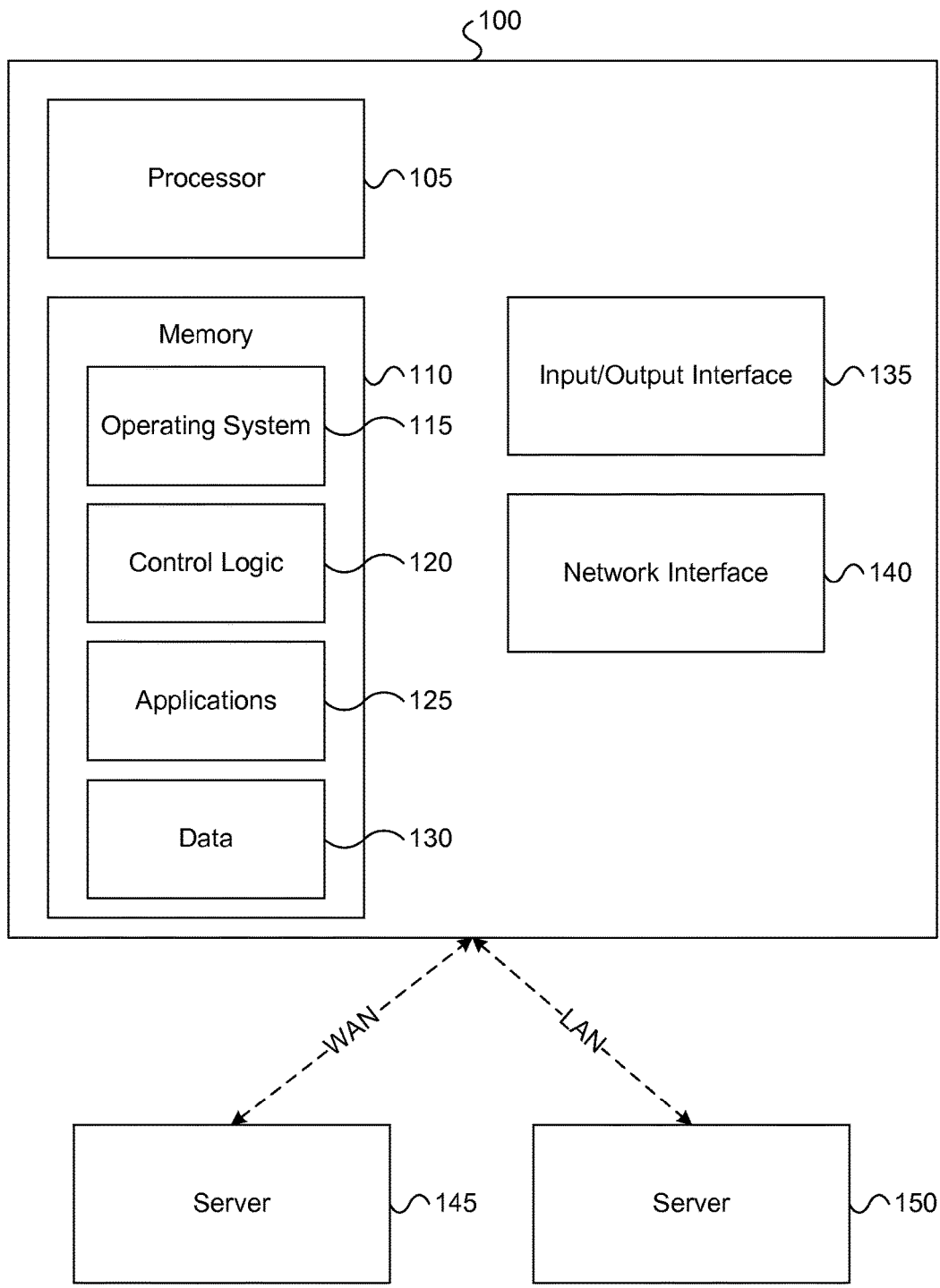
FIG. 1 depicts an example of a computing device that may be used in implementing one or more aspects of the disclosure in accordance with one or more illustrative aspects discussed herein.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a computer server, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the generic computing device 100 into a special purpose computing device in order to perform one or more of the various functions discussed herein.

In some arrangements, memory 110 may store, provide, and/or otherwise include an operating system 115, control logic 120, one or more applications 125, and/or data 130. Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audiovisual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Having discussed several examples of the computing system architecture that may be used in providing and/or implementing various aspects of the disclosure, a number of embodiments will now be discussed in greater detail. In particular, and as introduced above, some aspects of the disclosure generally relate to providing enhanced application interoperability. In the description below, various examples illustrating how such user interfaces may be provided in accordance with one or more embodiments will be discussed.

Figure 6:
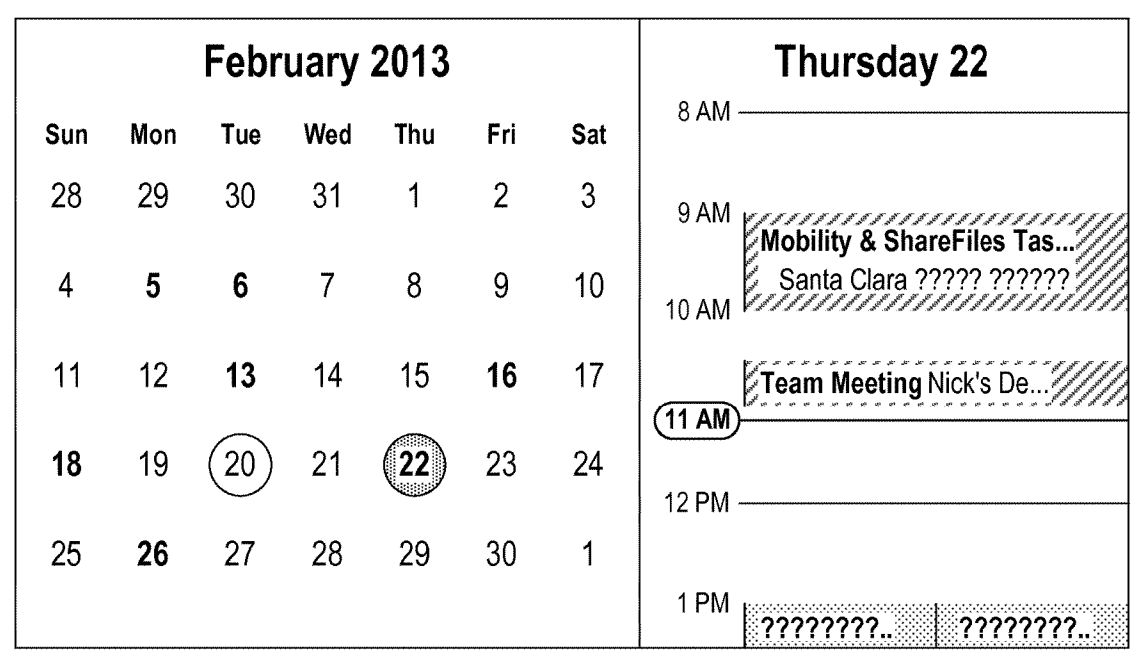
Figure 7:
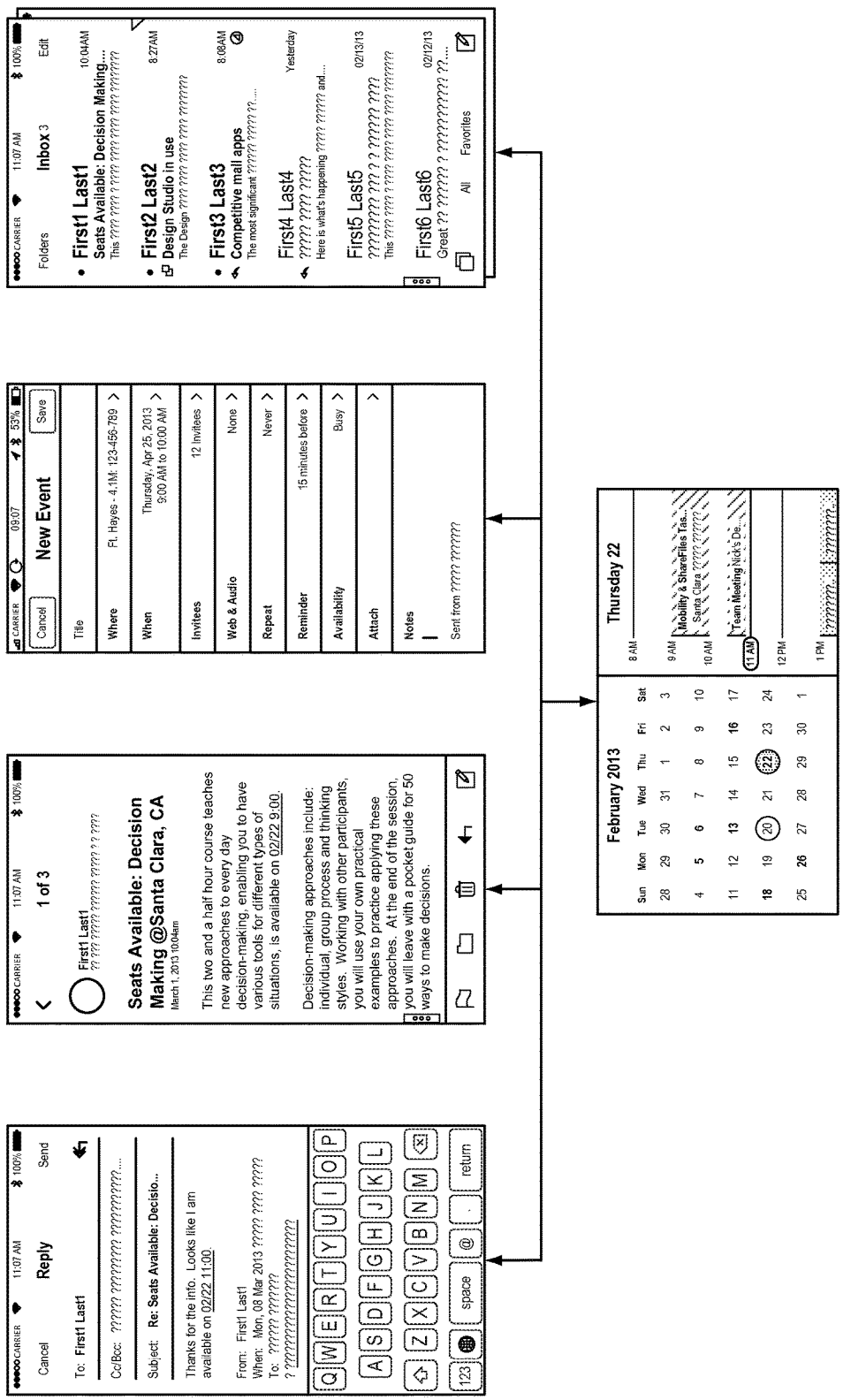

FIGS. 2-7 depict example user interfaces that may be displayed in accordance with one or more illustrative aspects discussed herein. For example, in the attached drawings, FIGS. 2-5 illustrate example user interfaces that may displayed by a mobile device when an application is being accessed to interact with one type of content in a first physical orientation (e.g., portrait orientation), and FIG. 6 illustrates an example user interface that may displayed after the mobile device is physically rotated to a different orientation (e.g., landscape orientation). FIG. 7 illustrates a larger composite view of the example user interfaces illustrated in FIGS. 2-6 to illustrate how these example user interfaces may be related. As discussed below, the example user interface illustrated in FIG. 6 may include content that is contextually related to the content that was previously displayed prior to the device being rotated (e.g., the content illustrated in FIGS. 2-5).

As seen in FIGS. 2-7, the feature of displaying a contextually related view of another application after a mobile device is physically rotated into a different orientation may provide a number of benefits. For example, this feature may allow a user to easily reference a calendar (which may, e.g., be provided by a calendar management application) while working on email (which may, e.g., be provided by an email management application different from the calendar management application). In conventional and/or existing systems, a user might have to manually tap a "home" button on his or her device (or execute another command, such as a double tap, to bring up an application switching menu) to switch between applications (e.g., to switch between an email application and a calendar application).

By implementing one or more aspects of the disclosure, a user may simply rotate their device into a different orientation (e.g., from portrait orientation to landscape orientation, from landscape orientation to portrait orientation, from a first orientation into a second orientation different from the first orientation, etc.) to view different content that is contextually related to and/or complementary to the content displayed prior to the rotation of the device. For instance, the user may rotate his or her mobile device while inside an email application, a task management application, or another application in order to reference their calendar.

In one or more arrangements, a toggle feature may additionally or alternatively be provided to control the application switching functionalities discussed above. In particular, such a toggle feature may allow a user to manually and/or temporarily disable application switching being performed in response to rotation of the device or other changes in device orientation. In this way, the toggle feature may allow the user to rotate the device and continue viewing the same application in a different orientation. For instance, the toggle feature may allow the user to view the current application in a landscape mode (e.g., by rotating the device from a portrait mode into a landscape mode) without switching to another application in response to the device rotation. Thus, if the user wishes to use the current application in landscape mode (e.g., to use a wider keyboard that may be available in landscape mode), the user can use this toggle feature to switch off the application switching feature discussed above, so that when the device is rotated, the current application may be maintained and not switched.

In one or more arrangements, the rotated calendar view (e.g., as seen in FIG. 6) may be contextually related to the content, application, and/or the user interface displayed prior to the rotation of the device. Thus, if a date or time is included and/or detected in the content of a user interface screen in portrait view (e.g., one of the example user interfaces illustrated in FIGS. 2-5), and the user subsequently rotates the device, the date and time shown in the calendar view may correspond to date and time included in the portrait view screen that was displayed prior to the rotation of the device.

While the examples discussed above illustrate how a calendar management application may be displayed as an alternative, contextually-related application when a device is rotated, similar functionalities could be extended to other types of applications. For example, when a device is rotated, contextually relevant content from any other type of application (e.g., task management content, email content, media and/or entertainment content, etc.) could be displayed instead of calendar content in response to the rotation of the device. For instance, if email content that includes an attachment, such as a slideshow or media file, is being viewed in a portrait orientation, physically rotating the device into a landscape orientation may cause a viewer for the slideshow or media file to launch so as to enable the user to view the content attached to the email content.

Some aspects of the disclosure may provide one or more benefits over conventional and/or existing software applications. For example, the application switching features discussed above may be particularly convenient when used on a mobile computing device, as these features may enable a user to switch between applications and/or unique content viewing areas using only one hand (e.g., the user can hold their smartphone, tablet computer, or other mobile device in the palm of one hand, and switch applications and/or content viewing areas simply by rotating the device). In addition, these rotation-based features may allow a user to quickly and easily access complementary information without additional taps and without leaving their current task or losing their place with the current application.

Although some mobile applications may allow a user to switch views within an application (e.g., to view the same information in either portrait view or landscape view) by physically rotating a mobile device, none of these applications allow a user to switch between applications or display complementary information (e.g., information that is different from and complementary to the previously displayed information) by rotating the device, as discussed in connection with one or more aspects of the disclosure.

Figure 8:
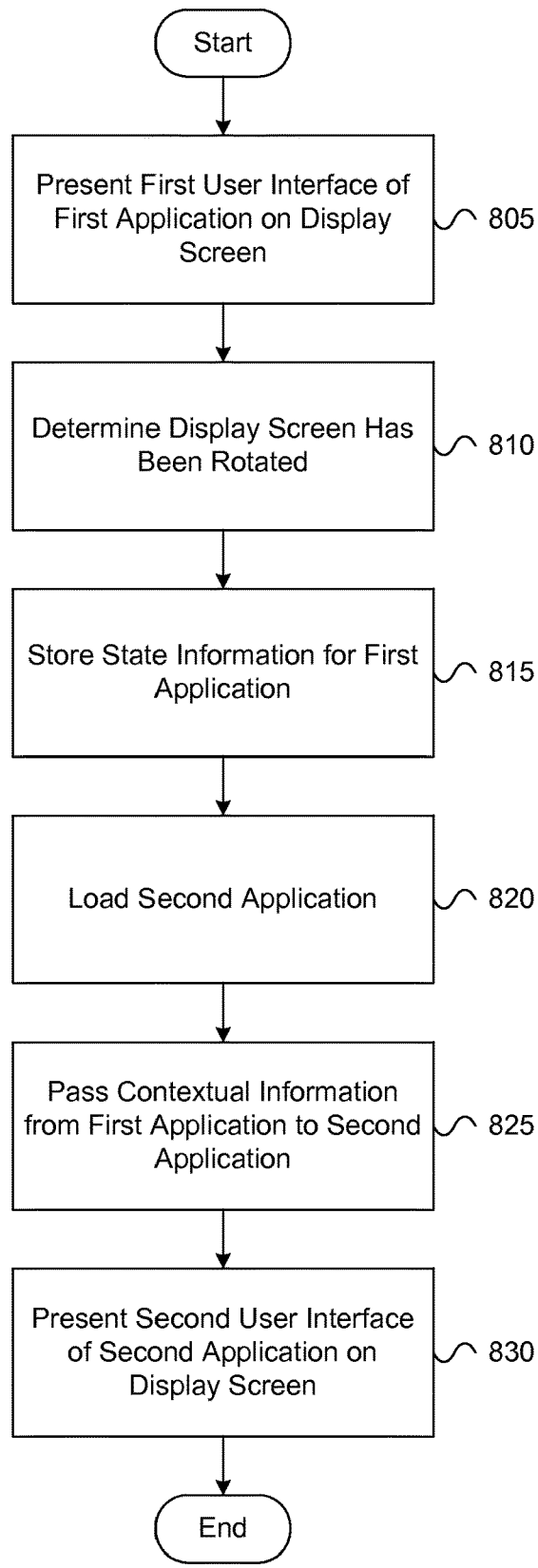
FIGS. 8-10 depict flowcharts that illustrate methods of providing enhanced application interoperability in accordance with one or more illustrative aspects discussed herein.

FIG. 8 depicts a flowchart that illustrates methods of providing enhanced application interoperability in accordance with one or more illustrative aspects discussed herein. In one or more embodiments, the method illustrated in FIG. 8 and/or one or more steps thereof may be performed by a computing device (e.g., generic computing device 100). Additionally or alternatively, the method illustrated in FIG. 8 and/or one or more steps thereof may, in some instances, be performed by a mobile device (which may implement one or more aspects of a computing device, such as generic computing device 100). In other embodiments, the method illustrated in FIG. 8 and/or one or more steps thereof may be embodied in computer-executable instructions that are stored in a computer-readable medium, such as a non-transitory computer-readable memory.

Figure 2:
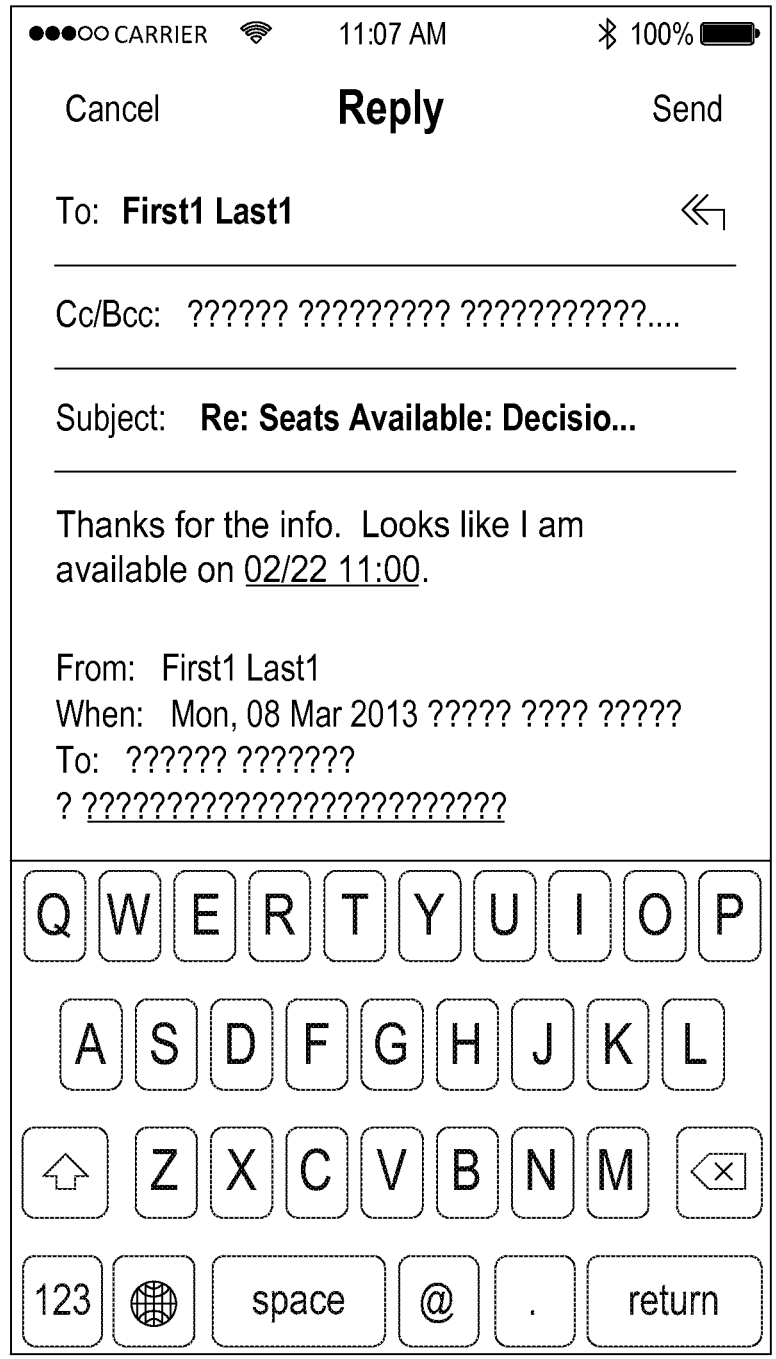
Figure 3:
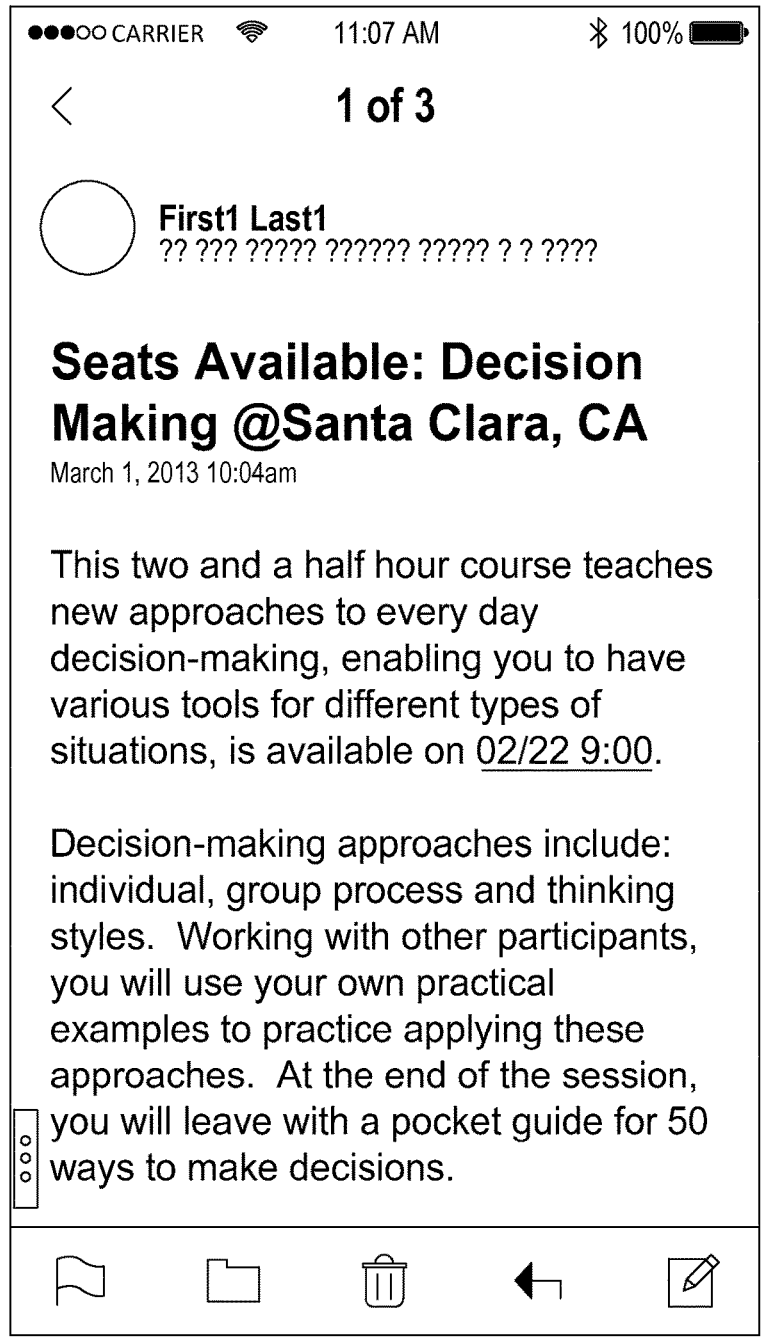
Figure 4:
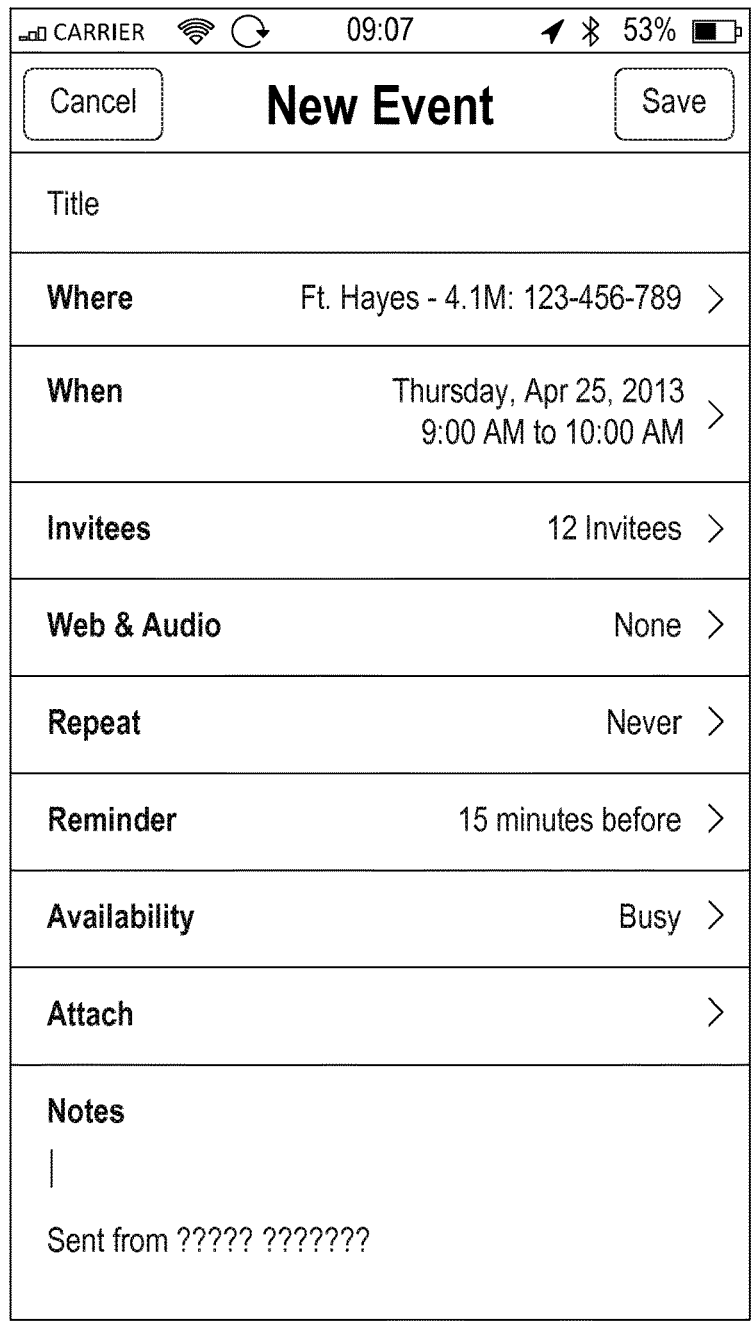
Figure 5:
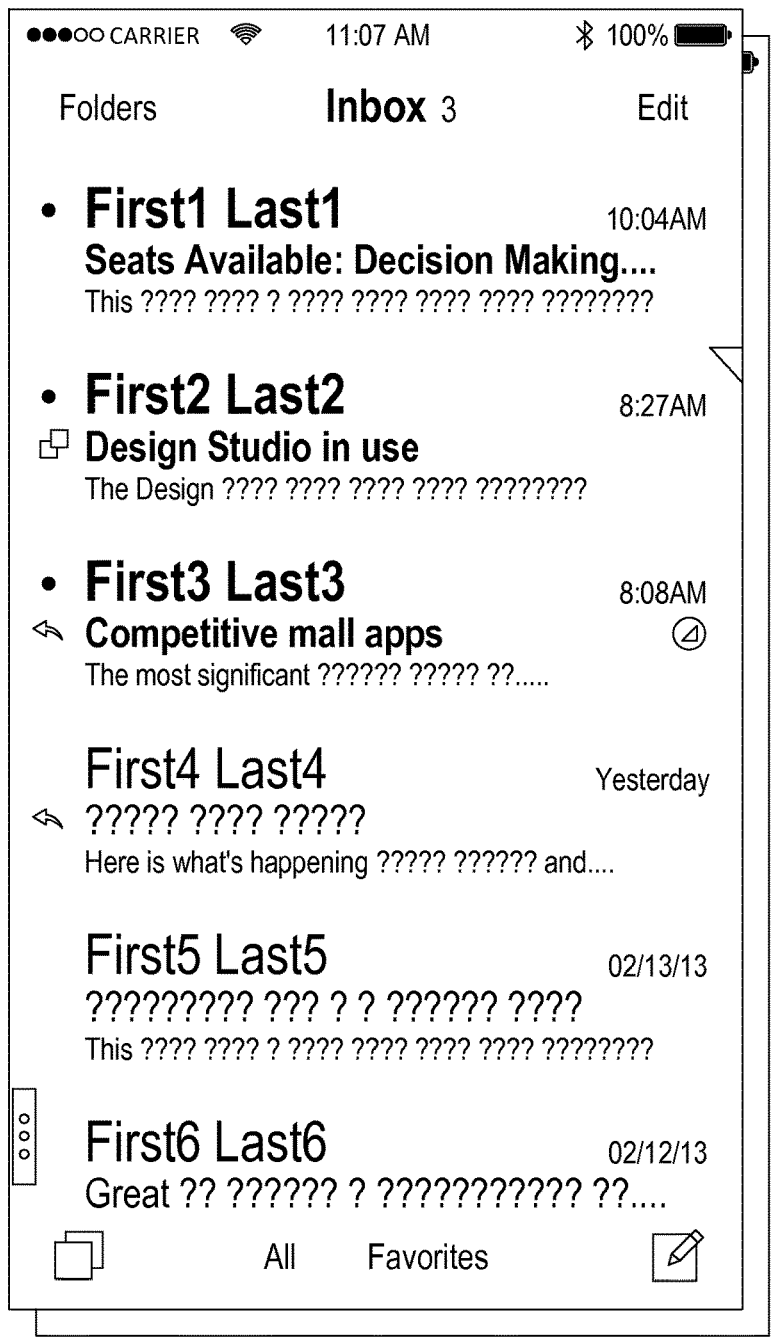

As seen in FIG. 8, the method may begin at step 805 in which a first user interface of a first application may be presented on a display screen. For example, at step 805, a computing device (e.g., generic computing device 100) may present, on at least one display screen (which may, e.g., be included in and/or communicatively coupled to the computing device), a first user interface that is associated with a first application. For example, the computing device may present a user interface that is associated with an email client application, as seen in FIG. 2, for instance. In some instances, the user interface (which may, e.g., be presented by the computing device at step 805) may include information that is usable by another application on the computing device in providing a different functionality. For instance, in the example illustrated in FIG. 2, an email being composed in the email client application may include time and/or date information that is usable by a calendar application (which may, e.g., be different from the email client application) in providing a calendar functionality. For instance, the calendar application may use the time and/or date information in presenting a calendar user interface that may include a daily, weekly, or monthly view of calendar entries for the time and/or date specified in the email being composed in the email client application.

Referring again to FIG. 8, at step 810, it may be determined that the display screen has been rotated. For example, at step 810, the computing device may determine that the at least one display screen has been rotated from a first orientation to a second orientation. In some instances, the computing device may determine that the at least one display screen has been rotated from a portrait orientation (which may, e.g., be the first orientation) to a landscape orientation (which may, e.g., be the second orientation) relative to the user of the computing device and/or relative to the ground. Additionally or alternatively, the computing device may determine that the at least one display screen has been physically rotated from a first orientation to a second orientation based on signals, input, and/or information received from one or more accelerometers and/or magnetometers that may be included in the at least one display screen and/or in the computing device. In instances in which the at least one display screen has been rotated from a portrait orientation to a landscape orientation, or vice versa, the portrait orientation and the landscape orientation may, for example, be substantially perpendicular to each other (e.g., within a predetermined range of being ninety-degrees relative to each other, such as within two percent or five percent of being perpendicular). In other instances, other orientations and/or associated rotations of the computing device and/or the at least one display screen may be similarly used and/or evaluated by the computing device at step 810 (e.g., instead of and/or in addition to portrait orientation and landscape orientation).

At step 815, state information for the first application may be stored. For example, at step 815, after determining that the at least one display screen has been rotated from the first orientation to the second orientation, the computing device may store state information for the first application. Such state information may, for instance, include information that is being accessed, created, modified, and/or otherwise used by the first application (e.g., in providing one or more functions associated with the first application). For example, in the example illustrated in FIG. 2, the computing device may store state information that includes information that defines and/or is otherwise associated with the email being composed in the email client application. As discussed in greater detail below, the state information (which may, e.g., be stored by the computing device at step 815) may enable the computing device to preserve the current operating state of the first application before switching to a different application, and accordingly may be used by the computing device when ultimately switching back to the first application (e.g., to return the user of the computing device to the first application in its preserved state).

At step 820, a second application may be loaded. For example, at step 820, after determining that the at least one display screen has been rotated from the first orientation to the second orientation, the computing device may load a second application (e.g., by initiating execution of and/or loading data associated with such a second application if, for instance, the second application is not already open and/or running on the computing device in a background mode). In some embodiments, the computing device may load the second application based on one or more settings and/or preferences that may, for example, specify that the second application is to be opened when the computing device and/or the at least one display screen is rotated to a particular orientation while presenting a user interface associated with the first application. For instance, such settings and/or preferences may link the first application and the second application in this way and/or may similarly link one or more other applications (e.g., such that particular orientations of the computing device and/or the at least one display screen may be associated with particular applications, and/or such that rotating the computing device and/or the at least one display screen while a specific application is presenting a user interface causes another specific application to be opened and/or presented, as illustrated below).

At step 825, contextual information from the first application may be passed to the second application. For example, at step 825, after determining that the at least one display screen has been rotated from the first orientation to the second orientation, and/or after storing state information for the first application and/or loading the second application, the computing device may pass contextual information from the first application to the second application. Such contextual information may, for instance, be passed in one or more messages that are processed by the computing device and/or sent by the first application to the second application. In some instances, such contextual information may include at least some information that is contextually related to the information included in the first user interface, such as the time and/or date information that is included in the example user interface illustrated in FIG. 2. In addition, the contextual information that is passed from the first application to the second application may enable the second application to present a user interface that is based on and/or that includes the contextual information, such as a user interface that includes and/or is based on the time and/or date information included in the email being composed in the example user interface illustrated in FIG. 2. In this way, the contextual information may allow the second application to access and/or present information in the second user interface that is contextually related to the information included in the first user interface of the first application.

At step 830, a second user interface of the second application may be presented on the display screen. For example, at step 830, based on determining that the at least one display screen has been rotated from the first orientation to the second orientation, the computing device may present, on the at least one display screen, a second user interface that is associated with a second application different from the first application. For instance, in response to determining that the at least one display screen has been rotated from the first orientation to the second orientation, the computing device may present a user interface that is associated with a different application than the user interface that was presented in the first orientation. For example, after determining that the at least one display screen has been rotated from the portrait orientation to the landscape orientation, the computing device may present a user interface that is associated with a calendar application, as seen in FIG. 6, for instance, after initially presenting a user interface associated with an email application as in the examples discussed above.

In one or more embodiments, the second user interface (which may, e.g., be presented by the computing device at step 830) may include at least some information that is contextually related to information included in the first user interface. For example, the contextually related information may include information that is common to and/or useable by both the first application and the second application in one or more different ways. For instance, in the example discussed above, the contextually related information may include time and/or date information, which may be usable by the email client application as message content and which also may be useable by the calendar application in displaying calendar content for the particular time and/or date specified by the time and/or date information.

In addition, in one or more embodiments, a state of the first application may be preserved when the second user interface that is associated with the second application is presented. For example, the computing device may store state information for the first application before opening and/or presenting the second user interface of the second application, and the stored state information may subsequently be used by the computing device in re-opening the first application and again presenting the first user interface of the first application (e.g., when the user of the computing device rotates the display screen back to the first application). In this way, the computing device may allow the user to pick up in the first application where he or she left off, as after rotating the display screen to the second orientation and then back to the first orientation, the user of the computing device may be able to access the first user interface of the first application in the state that he or she left it prior to initially rotating the display screen to the second orientation.

In some embodiments, functionality of the second application may be limited when the second user interface that is associated with the second application is presented on the at least one display screen in the second orientation. For example, when presenting the second user interface of the second application on the at least one display screen in the second orientation, the computing device may limit and/or otherwise reduce functionality of the second application. For instance, when presenting a calendar interface of the calendar application in the example discussed above, the computing device may restrict the functionality of the calendar application, such that the user of the computing device might be able to view the calendar interface and the contextually-related calendar content (e.g., calendar content associated with the particular date and/or time mentioned in the email content that was presented before the display screen was rotated), but might not be able to perform other functions via the calendar interface with other content that is not related to the contextually-related calendar content. For example, the user of the computing device might not be able to view event details for unrelated events, create one or more new events (e.g., other than one or more new events linked to and/or otherwise associated with the contextually-related calendar content), or perform other functions and/or interact with other data that is not relevant to the contextually-related calendar content. By limiting the functionality of the second application in this way (e.g., when the second user interface of the second application is presented in the second orientation after the at least one display screen is rotated), the computing device may simplify the user experience for the user of the computing device and may prevent the user of the computing device from getting lost in unrelated workflows. For instance, the computing device may allow the user to quickly and easily access and interact with the second application by rotating the at least one display screen, while helping the user to understand that the presentation of the second user interface in this mode is intended as a quick reference tool, rather than as a way of launching and/or accessing the full functionality of the second application (e.g., the calendar application).

In some embodiments, the first application may be suspended in a background mode when the second user interface that is associated with the second application is presented. For example, when presenting the second user interface of the second application (e.g., at step 830), the computing device may suspend the first application in a background mode in which the computing device continues to execute the first application and/or otherwise keeps the first application running, but no longer presents one or more user interfaces of the first application and/or otherwise no longer maintains the first application in focus. In the background mode, the computing device may, for instance, continue to execute one or more periodic functions of the first application, but might not pass any user input to the first application. For example, in instances in which the first application is an email client application, as in the examples discussed above, the computing device may continue to execute message polling functions associated with the email client application to check for new email messages after suspending the email client application in the background mode, but the computing device might not pass any user input and/or other input to the email client application while it is suspended in the background mode.

In some embodiments, the first application may provide contextual information to the second application in accordance with one or more policies. For example, when passing contextual information from the first application to the second application (e.g., at step 825), the computing device may apply, enforce, and/or otherwise use one or more policies to control how such contextual information is transferred from the first application to the second application. For instance, and as discussed above, the contextual information may include the at least some information that is contextually related to the information included in the first user interface and that is presented by the second application in the second user interface. Additionally or alternatively, the contextual information may allow the second application to access and/or present the at least some information in the second user interface that is contextually related to the information included in the first user interface. In some instances, the one or more policies may manage and/or allow data to be passed between the first application and the second application as the views presented by the computing device are updated and/or otherwise changed. For example, if the first application is presenting managed data, such as enterprise data that is managed by one or more enterprise mobile device management policies and/or one or more other policies, the computing device may enforce one or more policies requiring the second application to open in a managed mode and/or otherwise comply with the one or more mobile device management policies when accessing and/or using information which includes and/or which is contextually related to managed data that may be passed from the first application to the second application. For instance, if the first application is an email client application and the second application is a calendar application, as in the examples discussed above, and email content being presented by the email client application includes managed content, then when the at least one display screen is rotated, the computing device may enforce one or more policies that cause the calendar application to be opened in a managed mode and/or cause the calendar application to comply with the one or more policies when accessing and/or using information that includes and/or is otherwise contextually related to the managed content from the email client application. Such policies may, for instance, prevent the second application (e.g., the calendar application) from saving the managed content, copying and/or pasting the managed content, and/or otherwise using the managed content in one or more specific ways that may be defined by the one or more policies.

Figure 11:
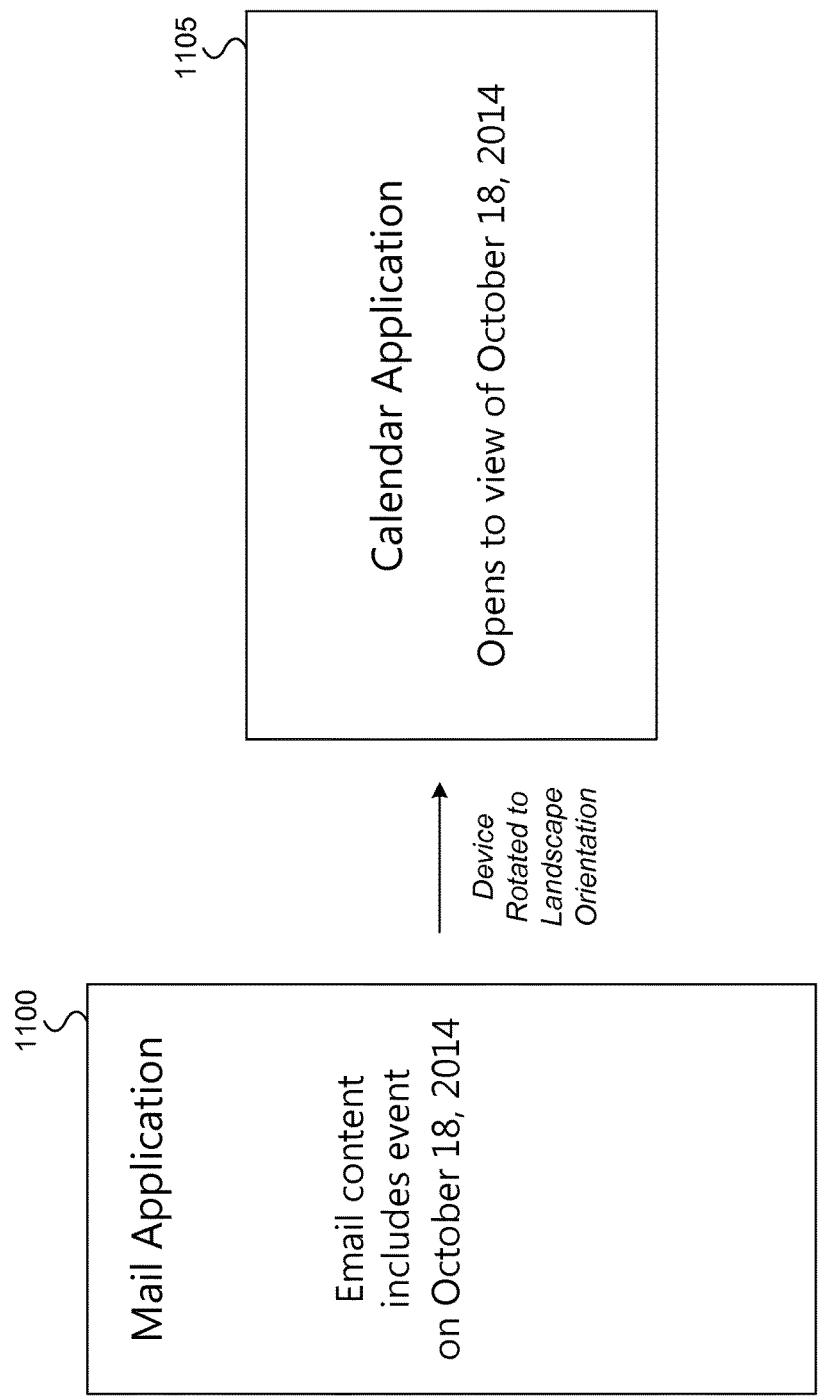
FIGS. 11-15 depict additional example user interfaces that may be displayed in providing enhanced application interoperability in accordance with one or more illustrative discussed herein.

In some embodiments, the first application may be a mail application and the second application may be a calendar application. For example, in some instances, the computing device may present one or more user interfaces of an email client application in a portrait orientation, and when the at least one display screen is rotated (e.g., to a landscape orientation), the computing device may present one or more user interfaces of a calendar application. An example illustrating how a mail application may be linked to a calendar application in this way is illustrated in FIG. 11. For example, as seen in FIG. 11, the computing device may present example user interface 1100 of an email client application while in a portrait orientation. When the computing device and/or a display screen of the computing device is rotated to a landscape orientation, the computing device may present example user interface 1105 of a calendar application. As seen in FIG. 11, user interface 1105 of the calendar application may include information that is contextually related to information that was presented in user interface 1100 of the email application. For example, user interface 1105 may open to and/or otherwise present a calendar view of a particular date that corresponds to a date mentioned in and/or otherwise associated with email content presented in user interface 1100.

Figure 12:
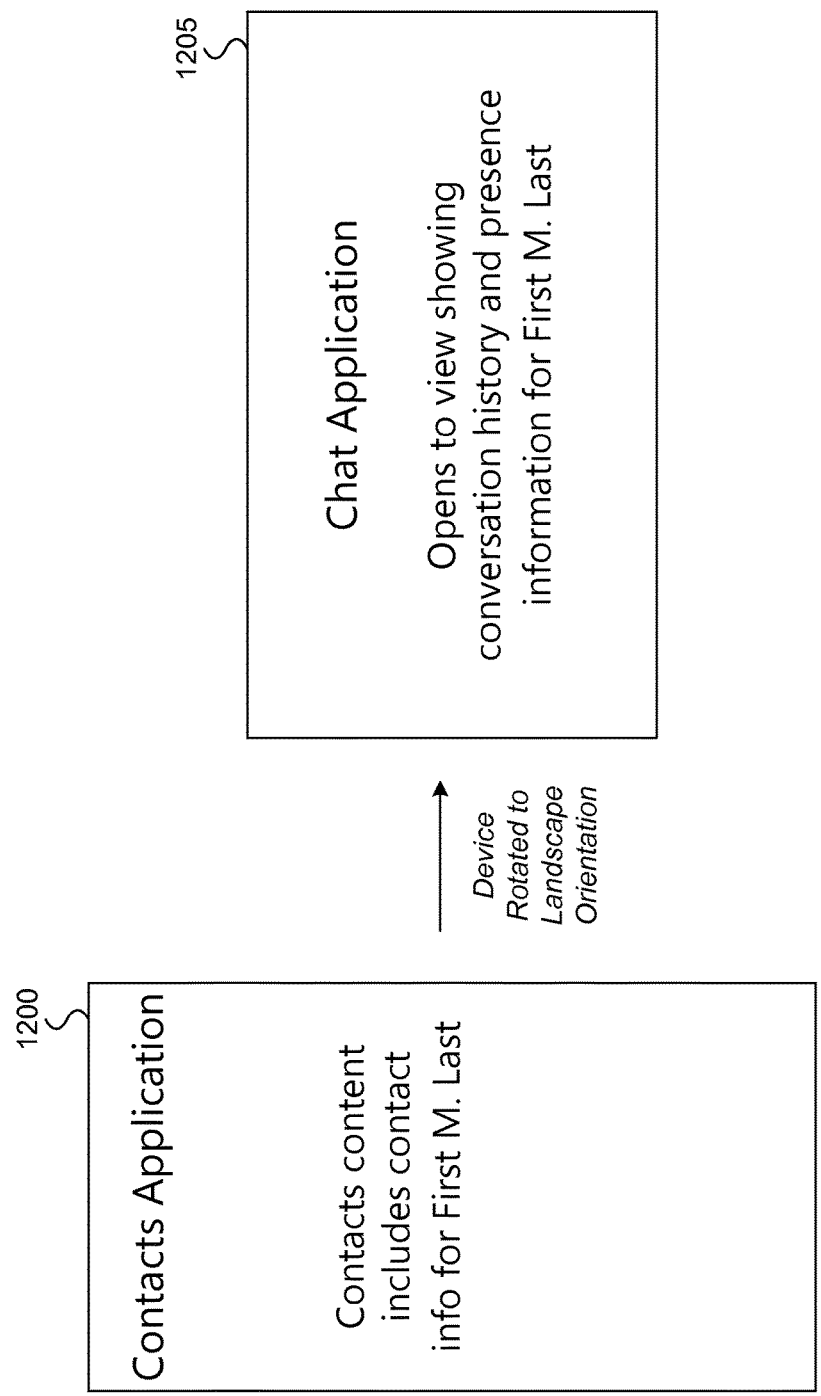

In some embodiments, the first application may be a contacts application and the second application may be a chat application. For example, in some instances, the computing device may present one or more user interfaces of a contacts application in a first orientation (e.g., a portrait orientation), and when the at least one display screen is rotated to a second orientation (e.g., to a landscape orientation), the computing device may present one or more user interfaces of a chat application. An example illustrating how a contacts application may be linked to a chat application in this way is illustrated in FIG. 12. For example, as seen in FIG. 12, the computing device may present example user interface 1200 of a contacts application while in a portrait orientation. When the computing device and/or a display screen of the computing device is rotated to a landscape orientation, the computing device may present example user interface 1205 of a chat application. As seen in FIG. 12, user interface 1205 of the chat application may include information that is contextually related to information that was presented in user interface 1200 of the contacts application. For example, user interface 1205 may open to and/or otherwise present a view of conversation history and/or presence information for a particular person corresponding to a person included in and/or otherwise associated with a contact card and/or other contact content presented in user interface 1200.

Figure 13:
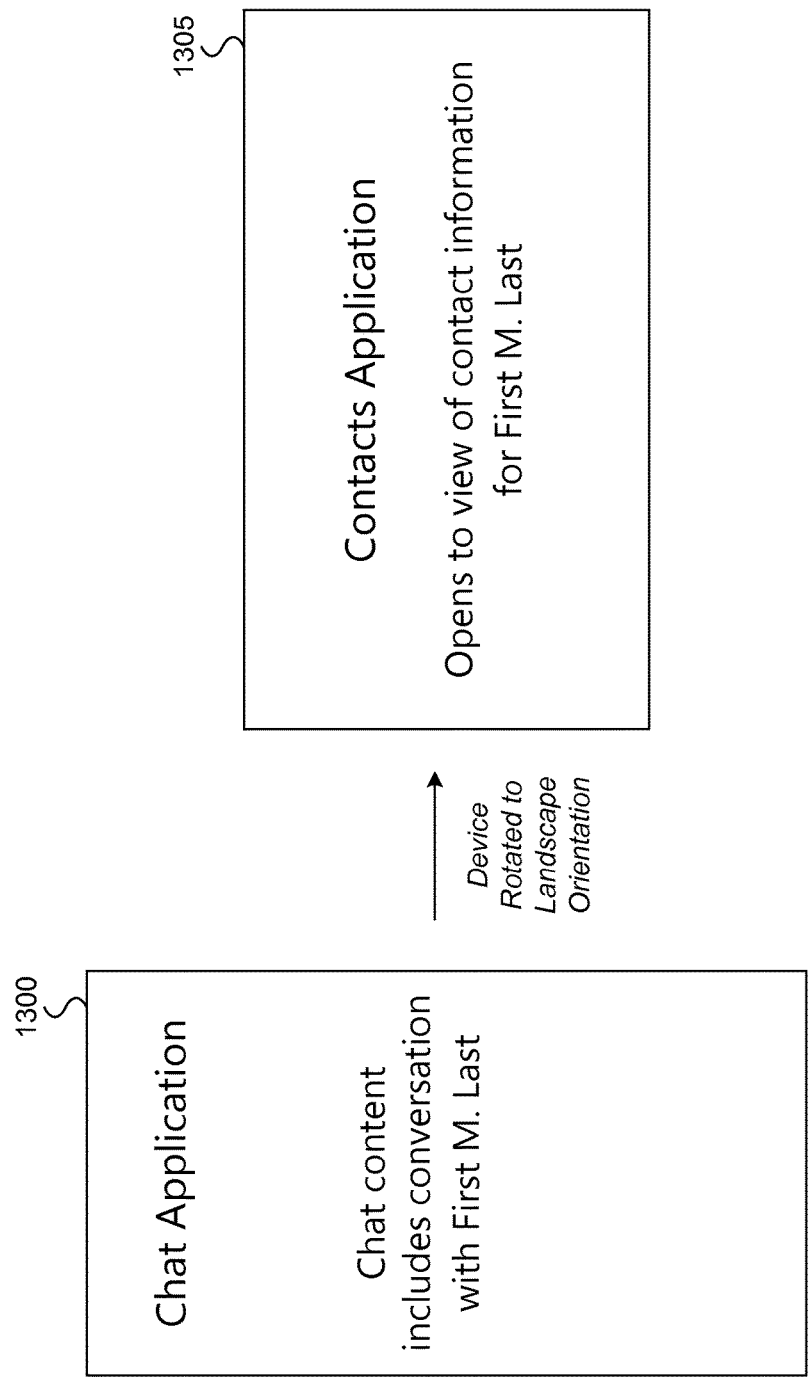

In other instances, the computing device may present one or more user interfaces of a chat application in a first orientation (e.g., a portrait orientation), and when the at least one display screen is rotated to a second orientation (e.g., to a landscape orientation), the computing device may present one or more interfaces of a contacts application. An example illustrating how a chat application may be linked to a contacts application in this way is illustrated in FIG. 13. For example, as seen in FIG. 13, the computing device may present example user interface 1300 of a chat application while in a portrait orientation. When the computing device and/or a display screen of the computing device is rotated to a landscape orientation, the computing device may present example user interface 1305 of a contacts application. As seen in FIG. 13, user interface 1305 of the contacts application may include information that is contextually related to information that was presented in user interface 1300 of the chat application. For example, user interface 1305 may open to and/or otherwise present a view of a contact card and/or other contact information for a particular person involved in a particular conversation and/or otherwise associated with particular chat content presented in user interface 1300.

Figure 14:
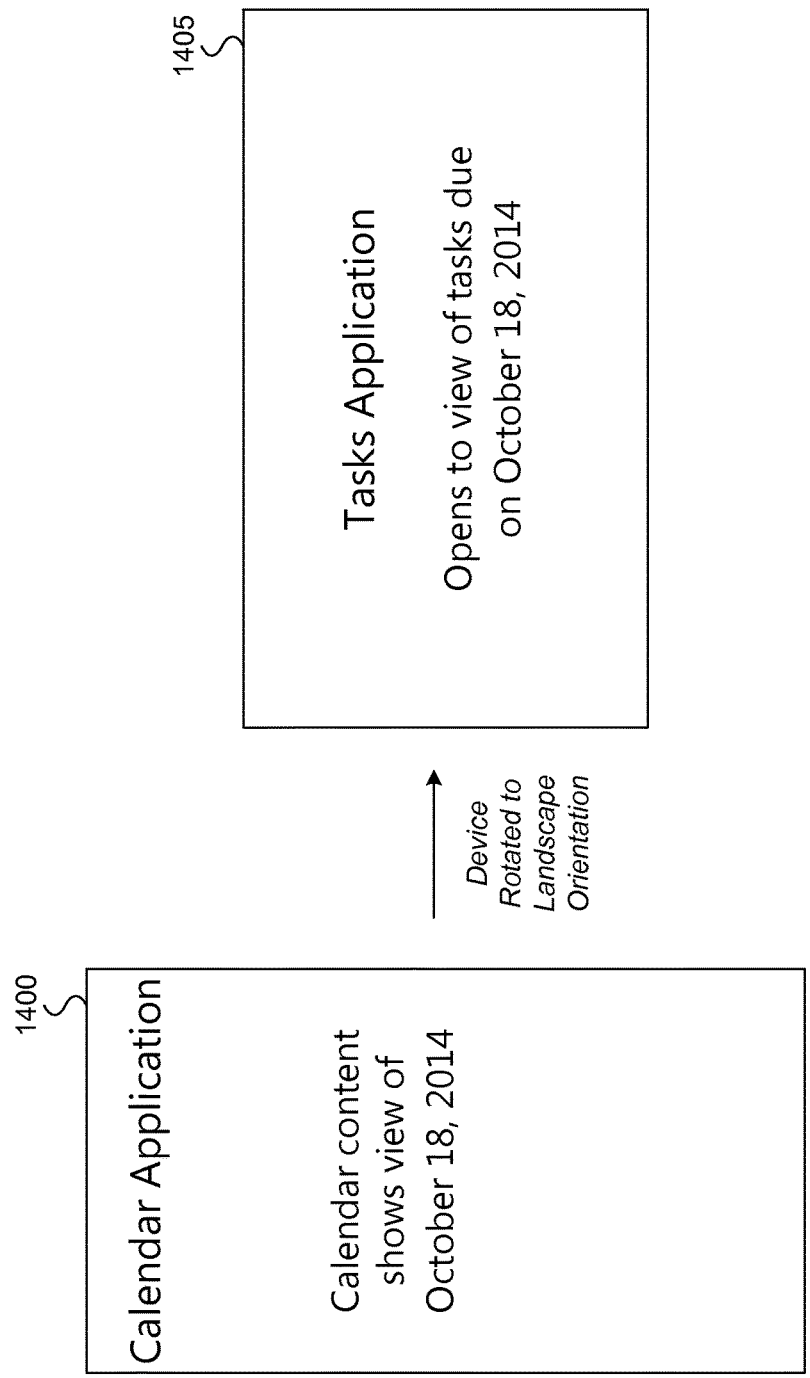

In some embodiments, the first application may be a calendar application and the second application may be a tasks application. For example, in some instances, the computing device may present one or more user interfaces of a calendar application in a portrait orientation, and when the at least one display screen is rotated (e.g., to a landscape orientation), the computing device may present one or more user interfaces of a tasks application. An example illustrating how a calendar application may be linked to a tasks application in this way is illustrated in FIG. 14. For example, as seen in FIG. 14, the computing device may present example user interface 1400 of a calendar application while in a portrait orientation. When the computing device and/or a display screen of the computing device is rotated to a landscape orientation, the computing device may present example user interface 1405 of a tasks application. As seen in FIG. 14, user interface 1405 of the tasks application may include information that is contextually related to information that was presented in user interface 1400 of the calendar application. For example, user interface 1405 may open to and/or otherwise present a view of one or more tasks that are due and/or otherwise associated with a particular date that corresponds to a date that was viewed in the calendar application and/or that is otherwise associated with calendar content presented in user interface 1400.

Figure 15:
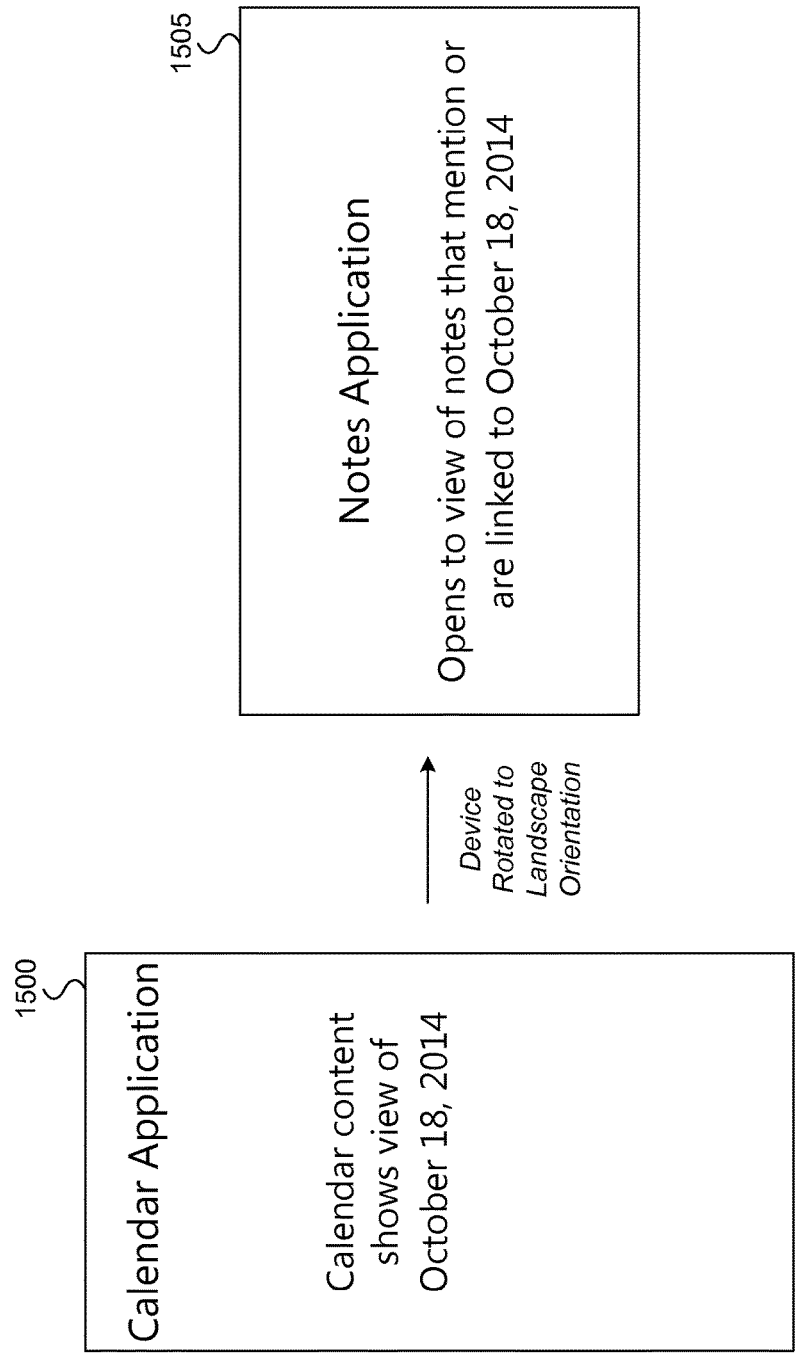

In some embodiments, the first application may be a calendar application and the second application may be a notes application. For example, in some instances, the computing device may present one or more user interfaces of a calendar application in a portrait orientation, and when the at least one display screen is rotated (e.g., to a landscape orientation), the computing device may present one or more user interfaces of a notes application. An example illustrating how a calendar application may be linked to a notes application in this way is illustrated in FIG. 15. For example, as seen in FIG. 15, the computing device may present example user interface 1500 of a calendar application while in a portrait orientation. When the computing device and/or a display screen of the computing device is rotated to a landscape orientation, the computing device may present example user interface 1505 of a notes application. As seen in FIG. 15, user interface 1505 of the notes application may include information that is contextually related to information that was presented in user interface 1500 of the calendar application. For example, user interface 1505 may open to and/or otherwise present a view of one or more notes that mention, are linked to, and/or are otherwise associated with a particular date that corresponds to a date that was viewed in the calendar application and/or that is otherwise associated with calendar content presented in user interface 1500.

Figure 9:
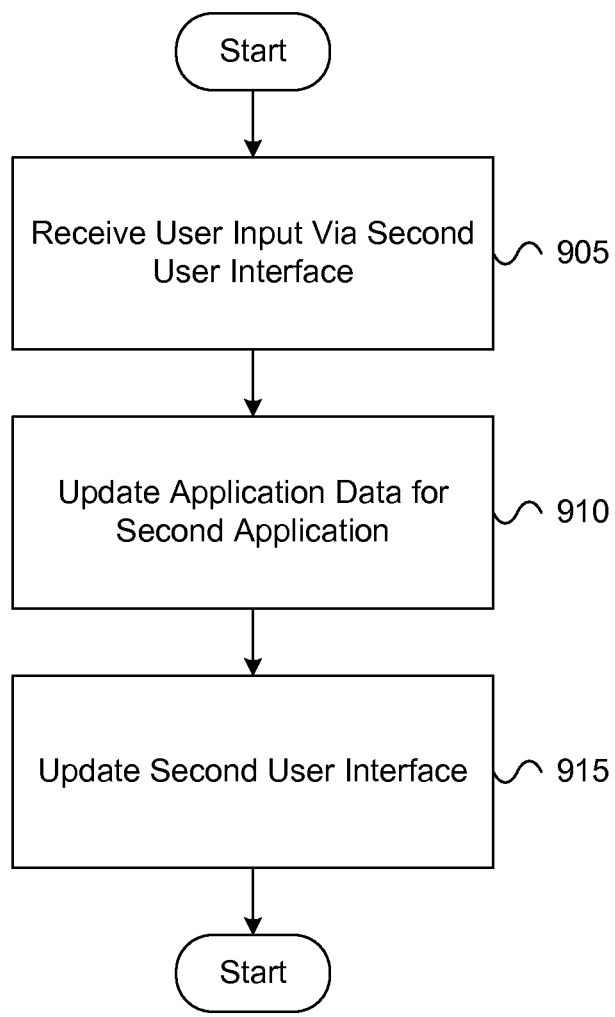

FIG. 9 depicts a flowchart that illustrates additional aspects of methods of providing enhanced application interoperability in accordance with one or more illustrative aspects discussed herein. In one or more embodiments, the method illustrated in FIG. 9 and/or one or more steps thereof may be performed by a computing device (e.g., generic computing device 100). Additionally or alternatively, the method illustrated in FIG. 9 and/or one or more steps thereof may, in some instances, be performed by a mobile device (which may implement one or more aspects of a computing device, such as generic computing device 100). In other embodiments, the method illustrated in FIG. 9 and/or one or more steps thereof may be embodied in computer-executable instructions that are stored in a computer-readable medium, such as a non-transitory computer-readable memory. In one or more embodiments, the method illustrated in FIG. 9 may be performed after and/or otherwise follow one or more of the other methods and/or method steps discussed herein, such as the example method discussed above with respect to FIG. 8.

As seen in FIG. 9, the method may begin at step 905 in which user input may be received via the second user interface. For example, after presenting the second user interface of the second application on the display screen (e.g., at step 830), the computing device may receive user input via the second user interface. For instance, in connection with the examples discussed above in which a calendar interface of a calendar application may be presented by the computing device after the at least one display screen is rotated, the computing device may receive input interacting with the calendar user interface, such as input scrolling through particular days and/or weeks, creating and/or modifying particular events in the calendar, and/or other input.

At step 910, application data for the second application may be updated. For example, at step 910, the computing device may update application data for the second application based on the user input received at step 905. For instance, in the example discussed above in which the calendar interface of the calendar application is presented by the computing device, the computing device may update calendar data for the calendar application, such as one or more calendar entries, based on the user input received at step 905.

At step 915, the second user interface may be updated. For example, at step 915, the computing device may update the second user interface based on the user input. For instance, in the example discussed above in which the calendar interface of the calendar application is presented by the computing device, the computing device may update the calendar interface based on the user input received at step 905. In updating the user interface, the computing device may, for example, update the calendar interface to reflect one or more new events created by the user of the computing device and/or to reflect one or more other changes made to the calendar by the user of the computing device.

Figure 10:
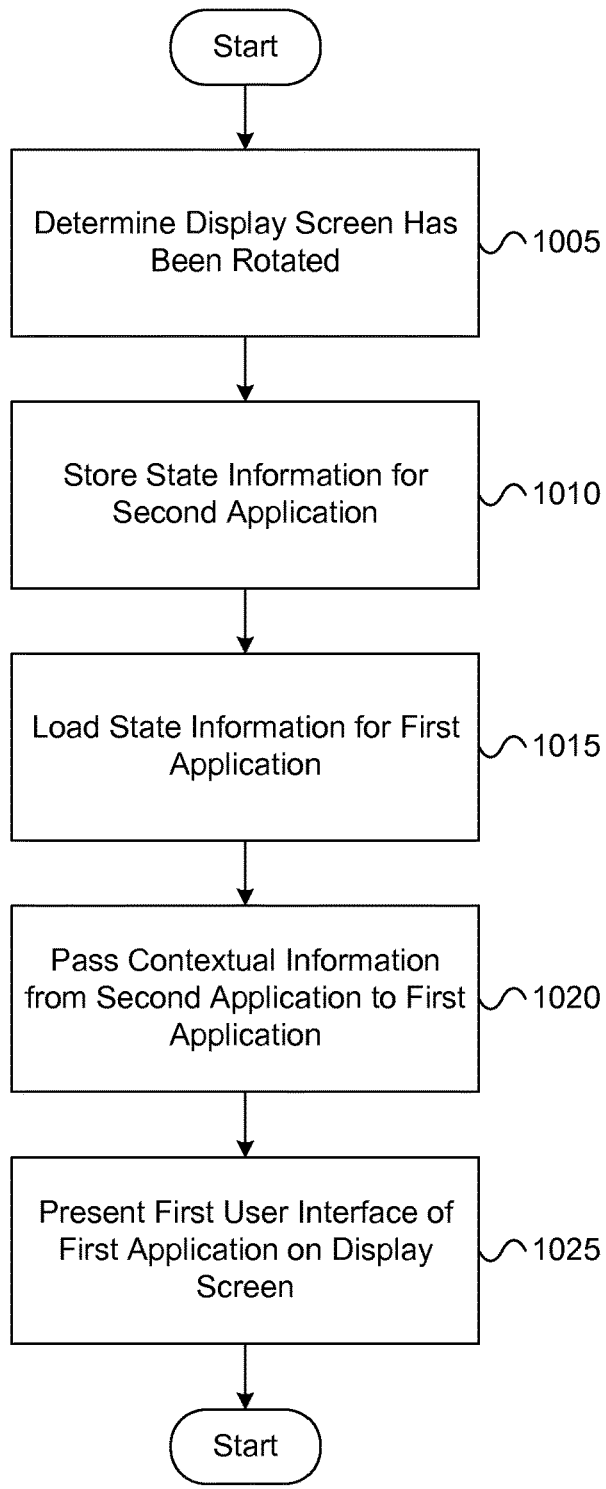

FIG. 10 depicts a flowchart that illustrates additional aspects of methods of providing enhanced application interoperability in accordance with one or more illustrative aspects discussed herein. In one or more embodiments, the method illustrated in FIG. 10 and/or one or more steps thereof may be performed by a computing device (e.g., generic computing device 100). Additionally or alternatively, the method illustrated in FIG. 10 and/or one or more steps thereof may, in some instances, be performed by a mobile device (which may implement one or more aspects of a computing device, such as generic computing device 100). In other embodiments, the method illustrated in FIG. 10 and/or one or more steps thereof may be embodied in computer-executable instructions that are stored in a computer-readable medium, such as a non-transitory computer-readable memory. In one or more embodiments, the method illustrated in FIG. 10 may be performed after and/or otherwise follow one or more of the other methods and/or method steps discussed herein, such as the example methods discussed above with respect to FIG. 8 and/or FIG. 9.

As seen in FIG. 10, the method may begin at step 1005 in which it may be determined that the display screen has been rotated. For example, after presenting the second user interface of the second application on the display screen (e.g., at step 830), the computing device may determine that the at least one display screen has been rotated from the second orientation to the first orientation. For instance, at step 1005, the computing device may determine that the at least one display screen has been rotated from the landscape orientation back to the portrait orientation. As in the examples discussed above, the computing device may make such a determination based on signals, input, and/or information received from one or more accelerometers and/or magnetometers that may be included in the at least one display screen and/or in the computing device.

At step 1010, state information for the second application may be stored. For example, at step 1010, after determining that the at least one display screen has been rotated from the second orientation to the first orientation, the computing device may store state information for the second application. Such state information may, for instance, include information that is being accessed, created, modified, and/or otherwise used by the second application (e.g., in providing one or more functions associated with the second application). For instance, in the examples discussed above in which a calendar application is presented when the at least one display screen is rotated into a landscape orientation, the computing device may store state information associated with the calendar application at step 1010. Such state information may, for instance, enable the computing device to preserve the operating state of the second application before switching back to the first application, and accordingly may be used by the computing device if the user of the computing device again rotates the at least one display screen to the landscape orientation to view the second application.

At step 1015, state information for the first application may be loaded. For example, at step 1015, the computing device may access and/or load the state information for the first application that may have been previously stored by the computing device (e.g., at step 815). As discussed above, such state information may define a previous operating state of the first application and may allow the computing device to resume and/or otherwise present the first application in the operating state that it was in before the at least one display screen was first rotated into the second orientation.

At step 1020, contextual information may be passed from the second application to the first application. For example, at step 1020, after determining that the at least one display screen has been rotated from the second orientation to the first orientation, the computing device may pass contextual information from the second application to the first application. Such contextual information may, for instance, be passed in one or more messages that are processed by the computing device and/or sent by the second application to the first application. As in the examples discussed above, the contextual information may include at least some information that is contextually related to the information included in the second user interface of the second application. In addition, the contextual information that is passed from the second application to the first application may enable the first application to present an updated user interface that is based on and/or that includes the contextual information received from the second application. In some instances, the second application may provide contextual information to the first application in accordance with one or more policies, similar to how the first application may provide contextual information to the second application in accordance with one or more policies in the examples discussed above.

At step 1025, the first user interface of the first application may be presented on the display screen. For example, based on determining that the at least one display screen has been rotated from the second orientation to the first orientation, the computing device may present, at step 1025 the first user interface that is associated with the first application on the at least one display screen. In this way, the computing device may return the user of the computing device to the first user interface of the first application when the display screen is rotated back to the first orientation (e.g., the portrait orientation) from the second orientation.

In some embodiments, the state of the first application may be restored when the first user interface that is associated with the first application is presented after determining that the at least one display screen has been rotated from the second orientation to the first orientation. For example, when presenting the first user interface of the first application at step 1025, the computing device may present the first application in the same state that it was in when the display screen was initially rotated to the second orientation (e.g., the landscape orientation) and the second user interface of the second application was initially displayed instead of the first user interface of the first application. As discussed above, the computing device may restore the first application to its previous state based on the state information (which may, e.g., have been stored by the computing device at step 815). Additionally or alternatively, the computing device may, in some instances, update the first user interface of the first application based on the user's interaction with the second user interface of the second application while the display screen was rotated to the second orientation. For instance, if the user created a calendar entry using the calendar application while using the display screen in the landscape orientation, such a calendar entry or other associated information may be reflected in the user interface of the email client application when the display screen is rotated back to the portrait orientation, to the extent that such a calendar entry may have any bearing on the email client application. In updating the user first interface of the first application (e.g., the email application in this example), the computing device may, for instance, update the first user interface of the first application based on the contextual information passed from the second application to the first application (e.g., at step 1020).

Figure 16:
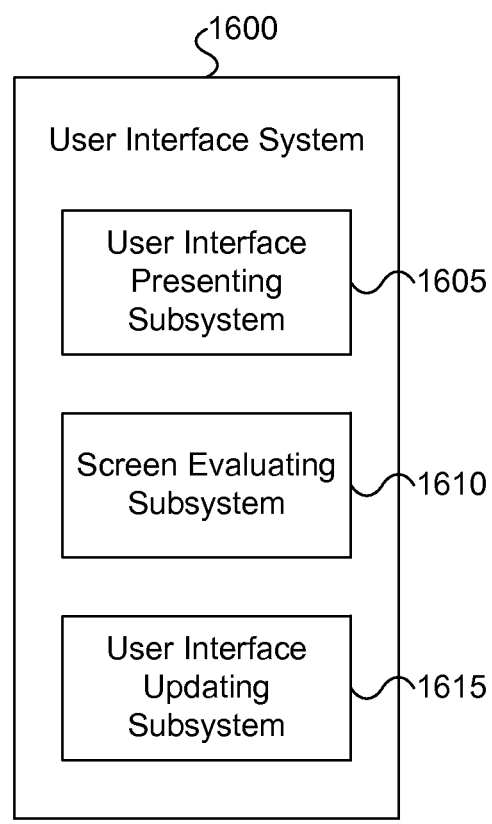
FIG. 16 depicts an example of a system for providing enhanced application interoperability in accordance with one or more illustrative aspects discussed herein.

FIG. 16 depicts an example of a system for providing enhanced application interoperability in accordance with one or more illustrative aspects discussed herein. As seen in FIG. 16, system 1600 may be configured to provide and/or implement various aspects of the disclosure. In some embodiments, system 1600 may include various subsystems that all may be implemented in computer-executable instructions that are stored and/or executed by a single computing device. In other embodiments, system 1600 and its various subsystems may be implemented in computer-executable instructions that are stored and/or executed by multiple different computing devices. For example, each subsystem included in system 1600 may be a separate, specifically-configured computing device, and each separate computing device may be communicatively coupled to enable operation of the system.

In one or more embodiments, system 1600 may include a user interface presenting subsystem 1605, a screen evaluating subsystem 1610, and a user interface updating subsystem 1615. The configuration of system 1600 illustrated in FIG. 16 is one example configuration of system 1600 that may be used in some arrangements. In other arrangements, system 1600 may include additional and/or alternative subsystems in addition to and/or instead of those illustrated and discussed herein.

In some embodiments, user interface presenting subsystem 1605 may be configured to present one or more graphical user interfaces, such as one or more of the example user interfaces discussed above. For example, user interface presenting subsystem 1605 may be configured to present a first user interface that is associated with a first application, such as an email composition user interface that is provided by and/or part of an email client application.

In some embodiments, screen evaluating subsystem 1610 may be configured to evaluate the orientation of one or more display screens that may be included in and/or connected to system 1600. For example, screen evaluating subsystem 1610 may be configured to determine whether one or more display screens have been rotated from a first orientation to a second orientation. For instance, screen evaluating subsystem 1610 may determine whether at least one display screen that is connected to system 1600 has been rotated from a portrait orientation to a landscape orientation.

In some embodiments, user interface updating subsystem 1615 may be configured to update one or more graphical user interfaces and/or otherwise cause system 1600 to present one or more updated graphical user interfaces. For example, user interface updating subsystem 1615 may be configured to present a second user interface that is associated with a second application different from the first application. For instance, user interface updating subsystem 1615 may present a second user interface associated with a second application, such as an event listing user interface associated with a calendar application, based on a determination by screen evaluating subsystem 1610 that at least one display screen connected to system 1600 has been rotated from a first orientation to a second orientation.

As illustrated in the discussion above, various aspects of the disclosure may be embodied in various forms. For instance, various aspects of the disclosure may be embodied in a method, in a computing device, in computer-executable instructions stored in a computer-readable medium, and/or in an apparatus. For example, various aspects of the disclosure may be embodied in a method executed by a computing device. In other examples, various aspects of the disclosure may be embodied in a computing device that includes at least one processor and memory storing computer-readable instructions that, when executed by the at least one processor, cause the computing device to perform any and/or all of the methods discussed above. In still other examples, various aspects of the disclosure may be embodied in one or more computer-readable media (which may, e.g., include a non-transitory computer-readable memory) storing instructions that, when executed by at least one processor, cause the at least one processor to perform any and/or all of the methods discussed above. In yet other examples, various aspects of the disclosure may be embodied in an apparatus comprising one or more means for performing any and/or all of the methods discussed above.

As illustrated above, various aspects of the disclosure relate to providing enhanced application interoperability. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method, comprising:
   presenting, by a computing device, and on a display screen of the computing device, a first user interface that is associated with a first application;
   detecting a physical rotation of the computing device from a first orientation to a second orientation;
   switching, by the computing device and in response to the detected physical rotation of the computing device, from the first application to a second application different from the first application, wherein switching from the first application to the second application comprises:
      launching, based on the detected physical rotation of the computing device and before receiving additional user inputs to the computing device, the second application;
      passing, from the first application to the second application, contextual information comprising at least some information included in the first user interface of the first application;
      replacing, by the computing device, and on the display screen, the first user interface associated with the first application with a second user interface that is associated with the second application to present the second user interface that is associated with the second application, the second user interface of the second application comprising at least some of the contextual information passed from the first application to the second application; and
      suspending the first application, wherein an operating state of the first application prior to the suspension is preserved during the suspension when the second user interface that is associated with the second application is presented, the preserved operating state of the first application allowing the computing device to resume operation of the first application at the preserved operating state after switching from the first application to the second application;

after presenting the second user interface that is associated with the second application, determining, by the computing device, that the computing device has been rotated from the second orientation to the first orientation; and based on determining that the computing device has been rotated from the second orientation to the first orientation, switching, by the computing device, from the second application back to the first application, wherein switching from the second application back to the first application comprises presenting, on the display screen, the first user interface that is associated with the first application, and wherein switching from the second application back to the first application comprises updating the first application based on second contextual information comprising at least some information included in the second user interface of the second application.

2. The method of claim 1, wherein functionality of the second application is limited when the second user interface that is associated with the second application is presented on the display screen in the second orientation.

3. The method of claim 2, wherein presenting the second user interface that is associated with the second application comprises reducing functionality of the second application by restricting access to content that is not related to the contextual information passed from the first application to the second application.

4. The method of claim 1, wherein the first application is suspended in a background mode when the second user interface that is associated with the second application is presented.

5. The method of claim 1, comprising:
after presenting the second user interface that is associated with the second application, receiving, by the computing device, user input via the second user interface; and
updating, by the computing device, the second user interface based on the user input.

6. The method of claim 1, wherein the preserved operating state of the first application is restored when the first user interface that is associated with the first application is presented after determining that the computing device has been rotated from the second orientation to the first orientation.

7. The method of claim 1, wherein passing the contextual information from the first application to the second application comprises passing the contextual information from the first application to the second application in accordance with one or more policies.

8. The method of claim 7, wherein passing the contextual information from the first application to the second application in accordance with the one or more policies comprises enforcing at least one enterprise mobile device management policy that causes the second application to be opened in a managed mode.

9. The method of claim 1, wherein the first application is a mail application and the second application is a calendar application.

10. The method of claim 1, wherein the first application is a contacts application and the second application is a chat application.

11. The method of claim 1, wherein the first application is a calendar application and the second application is a tasks application.

12. The method of claim 1, wherein the first application is a calendar application and the second application is a notes application.

13. One or more non-transitory computer-readable media having computer-executable instructions stored thereon that, when executed, cause a computing device to:
present, on a display screen of the computing device, a first user interface that is associated with a first application;
detect a physical rotation of the computing device from a first orientation to a second orientation;
switch, in response to the detected physical rotation of the computing device, from the first application to a second application different from the first application, wherein switching from the first application to the second application comprises:
launching, based on the detected physical rotation of the computing device and before receiving additional user inputs to the computing device, the second application;
passing, from the first application to the second application, contextual information comprising at least some information included in the first user interface of the first application;
replacing, on the display screen, the first user interface associated with the first application with a second user interface that is associated with the second application to present the second user interface that is associated with the second application, the second user interface of the second application comprising at least some of the contextual information passed from the first application to the second application; and
suspending the first application, wherein an operating state of the first application prior to the suspension is preserved during the suspension when the second user interface that is associated with the second application is presented, the preserved operating state of the first application allowing the computing device to resume operation of the first application at the preserved operating state after switching from the first application to the second application;
after presenting the second user interface that is associated with the second application, determine that the computing device has been rotated from the second orientation to the first orientation; and
based on determining that the computing device has been rotated from the second orientation to the first orientation, switch from the second application back to the first application,
wherein switching from the second application back to the first application comprises presenting, on the display screen, the first user interface that is associated with the first application, and
wherein switching from the second application back to the first application comprises updating the first application based on second contextual information comprising at least some information included in the second user interface of the second application.

14. The one or more non-transitory computer-readable media of claim 13, wherein functionality of the second application is limited when the second user interface that is associated with the second application is presented on the display screen in the second orientation.

15. The one or more non-transitory computer-readable media of claim 13, wherein passing the contextual information from the first application to the second application comprises passing the contextual information from the first application to the second application in accordance with one or more policies.

16. A computing device, comprising:
at least one processor; and
memory storing computer-readable instructions that, when executed by the at least one processor, cause the computing device to:
present, on a display screen of the computing device, a first user interface that is associated with a first application;
detect a physical rotation of the computing device from a first orientation to a second orientation;
switch, in response to the detected physical rotation of the computing device, from the first application to a second application different from the first application, wherein switching from the first application to the second application comprises:
launching, based on the detected physical rotation of the computing device and before receiving additional user inputs to the computing device, the second application;
passing, from the first application to the second application, contextual information comprising at least some information included in the first user interface of the first application;
replacing, on the display screen, the first user interface associated with the first application with a second user interface that is associated with the second application to present the second user interface that is associated with the second application, the second user interface of the second application comprising at least some of the contextual information passed from the first application to the second application; and
suspending the first application, wherein an operating state of the first application prior to the suspension is preserved when the second user interface that is associated with the second application is presented, the preserved operating state of the first application allowing the computing device to resume operation of the first application at the preserved operating state after switching from the first application to the second application;
after presenting the second user interface that is associated with the second application, determine that the computing device has been rotated from the second orientation to the first orientation; and
based on determining that the computing device has been rotated from the second orientation to the first orientation, switch from the second application back to the first application,
wherein switching from the second application back to the first application comprises presenting, on the display screen, the first user interface that is associated with the first application, and
wherein switching from the second application back to the first application comprises updating the first application based on second contextual information comprising at least some information included in the second user interface of the second application.

17. The computing device of claim 16, wherein functionality of the second application is limited when the second user interface that is associated with the second application is presented on the display screen in the second orientation.

18. The computing device of claim 17, wherein presenting the second user interface that is associated with the second application comprises reducing functionality of the second application by restricting access to content that is not related to the contextual information passed from the first application to the second application.

19. The computing device of claim 16, wherein passing the contextual information from the first application to the second application comprises passing the contextual information from the first application to the second application in accordance with one or more policies.

20. The computing device of claim 19, wherein passing the contextual information from the first application to the second application in accordance with the one or more policies comprises enforcing at least one enterprise mobile device management policy that causes the second application to be opened in a managed mode.

* * * * *